Nov. 16, 1943.  H. V. HEDEEN ET AL  2,334,193
VEHICLE SEAT ADJUSTMENT AND LOCK
Filed May 13, 1940   2 Sheets-Sheet 1

Inventors
Henry V. Hedeen
Carl Hedeen

Strouch & Hoffman
Attorneys

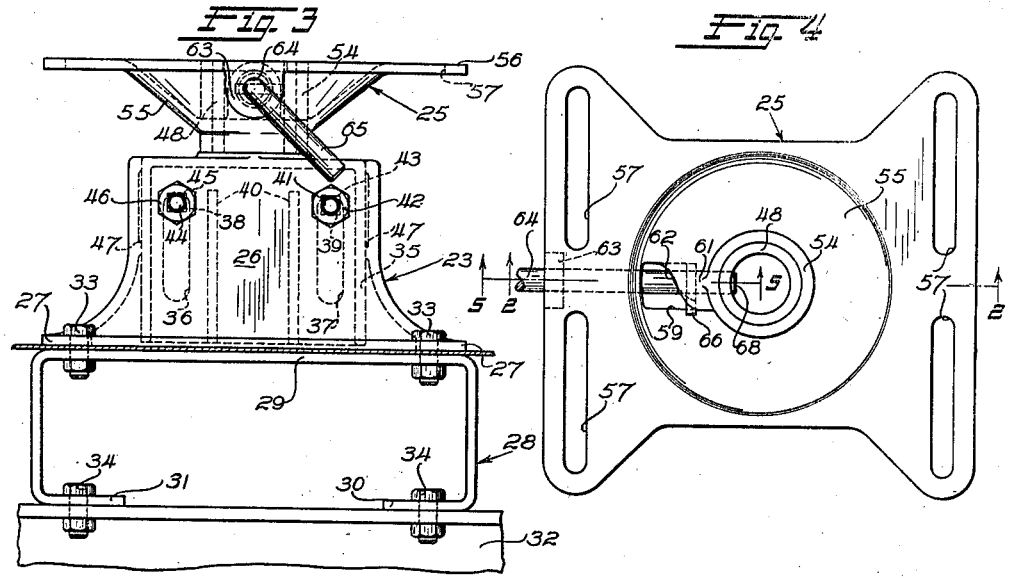
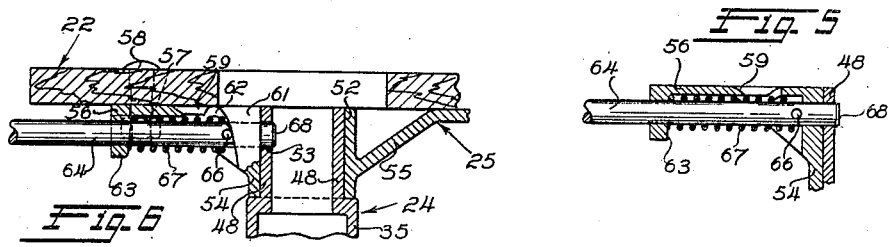
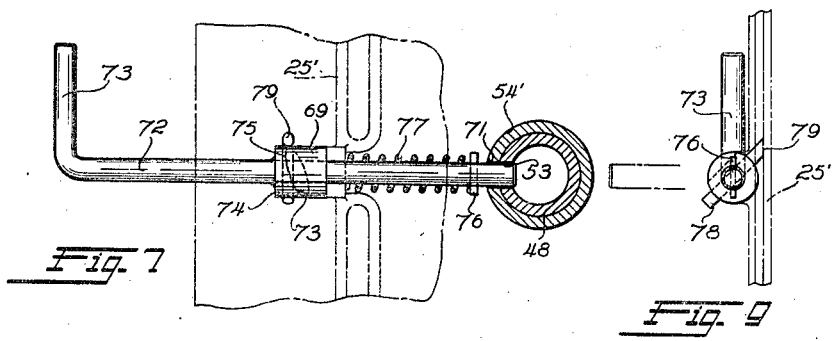

Patented Nov. 16, 1943

2,334,193

UNITED STATES PATENT OFFICE 2,334,193

VEHICLE SEAT ADJUSTMENT AND LOCK

Henry V. Hedeen and Carl Hedeen, Detroit, Mich., assignors to Divco-Twin Truck Company, Detroit, Mich., a corporation of Michigan Application May 13, 1940, Serial No. 334,924

3 Claims. (Cl. 155—95)

This invention relates to vehicle drivers' seats and is more particularly concerned with mechanism supporting such seats.

It is a major object of the invention to provide a novel shiftable driver's seat for a vehicle which is capable of being positioned so as to be available for immediate seating of the driver as soon as he enters the vehicle, and which becomes automatically locked in a stationary position when moved to face the vehicle controls. Specifically, this arrangement is desirable in a delivery vehicle having a low level entrance floor and wherein the pedal controls for the vehicle are located at an elevated floor.

It is a further object of the invention to provide a driver's seat swingably or otherwise shiftably mounted on a pedestal within the body of a vehicle with novel mechanism for automatically locking the seat to the pedestal when the former is swung or shifted to face the vehicle controls. Preferably the locking mechanism also frictionally maintains the seat temporarily in other positions during its normal range of movement on the pedestal.

A further object of the invention is to provide a novel driver's seat supporting mechanism for a vehicle wherein the seat supporting mechanism is secured directly to the chassis by a special bracket. Preferably this bracket is attached to one of the main longitudinal frame rails.

A further object of the invention is to provide novel, sturdy but simple and economical mechanism for rotatably supporting a vehicle seat. Preferably this mechanism is provided with a releasable device for automatically locking the seat facing the vehicle controls.

A further object of the invention is to provide a novel vehicle seat support wherein the seat is rotatively supported upon a vertically adjustable stationary pedestal and releasable means comprising a spring loaded and cam controlled locking rod is provided for locking the seat to the pedestal when a predetermined position of rotation of the seat on the pedestal has been reached. Preferably the locking rod has a handle conveniently accessible to the seated driver.

Further objects of the invention will presently appear as the description proceeds in connection with the appended claims and annexed drawings in which:

Figure 3 is a side elevation of the seat support assembly of Figure 2, illustrating especially the mechanism for vertically adjusting the seat as to the dotted line position of Figure 2.

Figure 4 is a top plan view of the seat support assembly illustrating especially the cam and spring controlled locking rod for securing the seat base to the pedestal;

Figure 5 is a section taken along line 5—5 of Figure 4 illustrating the cam face which controls the movement of the locking rod;

Figure 6 is a fragmentary elevation, partly in section and partly cut-away, illustrating further the shape of the cam which controls the seat locking rod.

Figure 7 is a plan view partly in section illustrating a further embodiment of my cam and spring control locking rod mechanism;

Figure 8 is a section illustrating the cooperating cam formations on the seat base and locking rod of Figure 7; and Figure 9 is a side elevation of the device of Figure 7, with the locking rod handle rotated through a quarter of a turn.

Figure 1 illustrates our novel seat support assembly mounted in a sitting-drive delivery vehicle of the type wherein a box-like body 11 extends over and houses substantially the whole chassis including the wheels and forwardly disposed motor.

Figure 1:
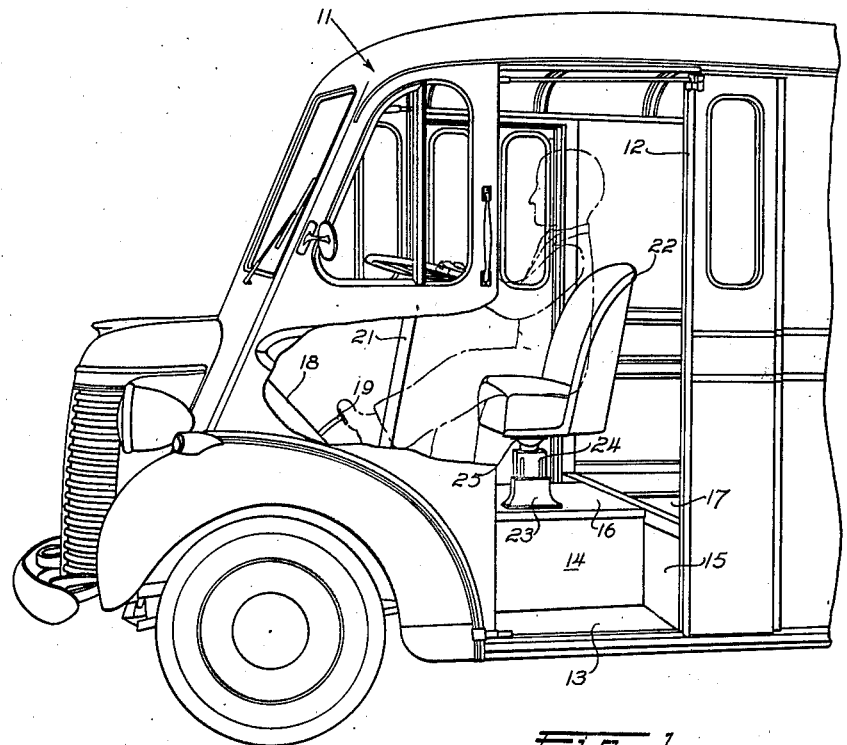
Figure 1 is a fragmentary perspective view of the front end of a delivery vehicle embodying the novel seat assembly of the invention, partially cut away to show the seated driver at the vehicle controls.

Body 11 is provided with a forwardly disposed side doorway 12 extending from the roof to a low level floor 13 inside the body and located substantially only a single short step above the level of the ground upon which the vehicle wheels rest.

Floor 13 extends inwardly to a vertical riser panel 14 adjacent the longitudinal frame rail of the chassis at that side. The rear edge of doorway 12 and the rear edge of panel 14 are connected by a vertical panel 15, and the front edge of the doorway is connected to the front end of panel 14 by a vertical panel (not shown) similar to panel 15. These three vertical panels and floor 13 define a step well which is of standing height clearance and enables the driver to enter and stand wholly inside the body without bending and with a minimum of effort. A similar, and preferably identical, side doorway and step well arrangement is provided at the opposite side of the body. Suitable doors are provided for closing each doorway.

Between the step wells, a metal body floor 16 bridges the chassis at substantially the same horizontal level as the rear body loading floor 17.

Forwardly of floor 16, the interior of the body is formed with an elevated floor 18 at which are located suitable vehicle control pedals 19, a steering post 21, and other essential vehicle controls. The novel features of this body front end construction are described and claimed in the copending application of John Nicol, Serial No. 333,661 filed May 6, 1940.

A driver's seat 22, which may be of any suitable construction is rotatably and vertically adjustably supported above floor 16 in alignment with the above described vehicle controls.

Our novel seat support comprises generally a floor socket 23, a pedestal 24 mounted for vertical adjustment in the socket but maintained against rotation therein, and a seat base 25 which is rotatable on the pedestal. Seat 22 is securely fastened to seat base 25 in a suitable manner.

Figure 2:
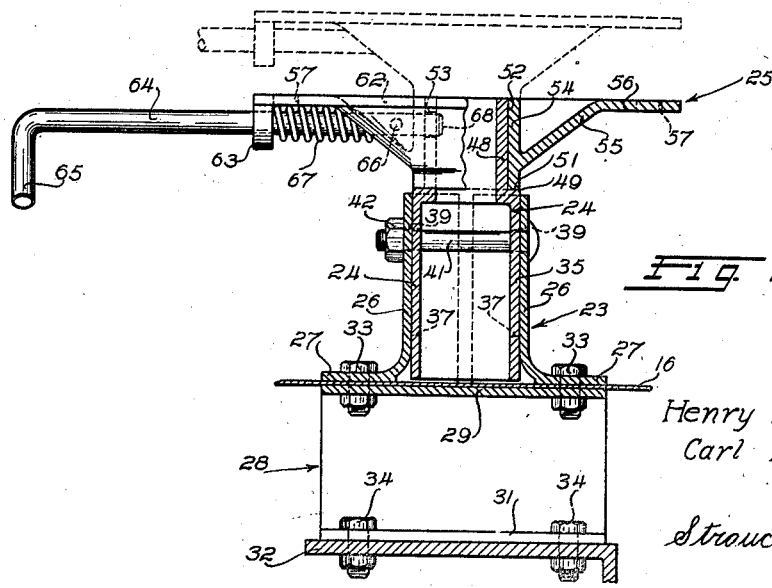
Figure 2 is a sectional view taken generally along line 2—2 of Figure 4 and also illustrating the special bracket for supporting the driver's seat assembly directly on the chassis beneath the vehicle floor.

Referring to Figures 2 and 3, floor socket 23 comprises a pair of spaced mated elements 26 formed with outwardly flaring bottom flanges 27 which rest on the upper surface of floor 16. A special integral channeled bracket 28 is provided with a bridge portion 29 backed against the bottom surface of floor 16 below the floor socket and a pair of inturned integral flanges 30 and 31 designed to rest flush on the upper surface of the left longitudinal frame rail 32 of the chassis. Bracket 28 is secured to flanges 27, as by a plurality of bolts 33 which pass through suitable apertures in floor 16, and bracket flanges 30 and 31 are rigidly secured, as by bolts 34, to rail 32.

The above construction insures that the seat socket is rigidly and solidly supported directly upon the chassis. The bracket also braces floor 16, and other suitable braces (not shown) may be provided between floor 16 and the chassis as desired.

Socket elements 26 are internally channel shaped and, when bolted to the bracket as illustrated in Figures 2 and 3, cooperate to define a sturdy open-top rectangular socket of substantial size upstanding from floor 16.

Pedestal 24 is preferably a hollow but rigid integral metal tube formed at its lower end with a tubular rectangular foot 35 which is of such size as to fit slidably within socket 23. Obviously socket 23 and foot 35 can be of any desired shape, other than rectangular, it being desirable only that the foot be slidably but non-rotatably fitted within the socket.

At opposite sides, rectangular foot portion 35 is provided with pairs of spaced vertically elongated slots 36 and 37 which are laterally aligned with pairs of bolt receiving apertures 38 and 39, respectively, in the upper portions of socket elements 26.

Bolt 41 projects through slots 37 and apertures 39 and terminates in a threaded portion carrying a suitable nut 42. Preferably bolt 41 is squared at its head at 43 to fit non-rotatably within the similarly shaped adjacent aperture 39. A similar bolt 44 having its head portion squared at 45 projects through slots 36 and apertures 38 and carries a terminal nut 46.

As shown in Figure 3, socket elements 26 are preferably formed with internal horizontal end ribs 47 which may be machined or ground to the contour of foot 35.

When nuts 42 and 46 are tightened, with socket elements 26 fastened to bracket 28, the upper ends of elements 26 are pulled toward each other and deformed sufficiently to clamp against foot portion 35 and retain it against vertical displacement in the socket.

Integral internal ribs 40 are provided for reenforcing and bracing the pedestal casting to prevent deformation when nuts 42 and 46 are tightened.

By the above construction, pedestal 24 may be maintained at any position of vertical adjustment within the range of slots 36 and 37. Ribs 47 not only guide foot portion 35 during assembly of the seat but fit closely enough to the foot to prevent it from rocking in the socket during operation of the vehicle.

Above foot portion 35, the pedestal is formed with an upstanding centrally located integral hollow cylindrical post 48 whose lower end is surrounded by an annular shoulder 49 having a flat horizontal annular thrust face 51. The outer cylindrical surface of post 48 and face 51 are preferably machined to make them absolutely smooth, and post 48 is provided with a radial aperture 53 for a purpose later to be described.

Post 48 and thrust face 51 provide bearing surfaces for rotatably supporting seat base 25 on the pedestal. Seat base 25 is formed with a rigid tubular central sleeve 54, preferably of the same length as post 48, which fits rotatably upon post 48 with its lower end face resting on thrust face 51. Post 48 and sleeve 54 are sufficiently long and of sufficient strength to avoid distortion of the pedestal by reason of any turning forces occasioned by weight of the driver and seat.

A hollow conical-shaped web 55, integral with sleeve 54, extends laterally and upwardly therefrom from a point adjacent thrust face 51 and terminates in a flat horizontal plate portion 56, the upper surface of which is preferably flush with the upper edges of post 48 and sleeve 54.

Plate 56 is provided with a series of elongated slots 57 through which extend suitable bolt assemblies 58 for securing seat 22 to the seat base 25. Any other suitable method of securing seat 22 to the seat base may be used.

Web 55 is apertured at one side at 59 and provided at that aperture with an integral hollow boss 61 which projects laterally and radially from sleeve 54. The outer end surface of boss 61 is formed as an inclined cam face 62 for a purpose later to be described.

Adjacent boss 61, seat base flange 56 is formed with a depending apertured lug 63. An elongated locking rod 64, formed with a laterally bent handle 65 at its outer end, is rotatably and slidably supported at its inner end by passing through lug 63 and boss 61.

Rod 64 carries a rigid diametral pin 66 which projects at one side a substantial distance from the rod to lie along cam face 62. A suitable coil spring 67 surrounds rod 64 and is compressed between the inner surface of lug 63 and pin 66. Spring 67 thereby reacts against the seat base to normally urge rod 64 axially inwardly toward post 48 and maintain pin 66 in close engagement with cam face 62.

Seat base 25 and post 48 are so cooperatively formed that when seat 22 is facing the vehicle controls at the front of the vehicle as in Figure 1, rod 64 is aligned with aperture 53 of post 48, and spring 67 urges the tip end 68 of rod 64 well into aperture 53 to thereby lock seat base 25 to pedestal 24.

Operation

The seat assembly is installed in the vehicle by mounting bracket 28 below floor 16 and then bolting socket members 26 to the bracket. The lower foot portions 35 of the pedestal is then slidably inserted in the socket and clamped by bolts 41 and 44 to support the seat at a vertical height satisfactory to the driver who is to use the vehicle. Usually this regulation of the height of the seat is not often necessary since the same driver ordinarily drives the same truck over long periods of time; and, where the vehicle is individually owned, this adjustment is probably never altered during the life of the truck. This adjustment can, however, be changed at any time whether the seat is mounted on the pedestal or removed therefrom.

With the pedestal clamped in the socket, seat base 25, with a suitable seat attached, is dropped directly upon upstanding post 48, substantially the entire weight being borne by thrust face 51. Thrust face 51 and the lower end face of sleeve 54 may be machined and if necessary lubricated to provide a good sliding bearing contact. In this manner the whole seat chair unit including the seat base is maintained by its weight on the pedestal and supported for rotation about a vertical axis on the pedestal. The seat unit may be removed readily from the pedestal merely by lifting it upwardly, with locking rod 64 disengaged from aperture 53.

When the seat is in the position illustrated in Figure 1 with the seated driver facing the vehicle controls in position to operate them, locking rod 64 carried by the seat base extends laterally inwardly of the vehicle at right angles to its longitudinal center line and handle 65 is conveniently accessible to the right hand of the seated driver.

In this position the seat is locked to the pedestal by reason of projection of rod 64 into aperture 53 as above described.

When the driver wishes to dismount from the vehicle or gain access to rear loading floor 17, his right hand grasps handle 65 and pulls it upwardly in a counterclockwise direction (Figure 3) for less than a quarter of the turn. This movement of handle 65 rotates rod 64 about its axis and simultaneously rod 64 is axially displaced radially outwardly from post 48 against the force of spring 67 because pin 66 follows inclined cam face 62. By the time pin 66 reaches a high point of cam face 62, tip end 68 of the rod has been entirely withdrawn from aperture 53 and seat base 25 is now free to rotate about post 48.

This rotation may be easily effected by movement of the driver's body as he swings his feet away from the controls and towards the side doorway 12 of Figure 1. After the seat has swung about a quarter of a turn toward the doorway, the driver's legs are suspended over floor 13 and he is enabled to drop from the seat directly to full standing position on floor 13 from which he may either gain access to the rear of the body or step directly out of the vehicle. In this manner, the driver is enabled to dismount from driving position with a minimum of effort since no upward or inward steps within the vehicle are involved. This appreciably cuts down his fatigue during the day and increases his efficiency.

As soon as handle 65 has been turned sufficiently to withdraw the rod from aperture 53 and the seat has been slightly rotated, the handle may be released by the driver. Spring 67 now urges the rod back toward post 48. By this time, however, the seat base has rotated sufficiently that rod 64 is no longer aligned with aperture 53 and the tip end 68 of rod 64 now abuts against cylindrical outer surface 52 of post 48.

The force of spring 67 is preferably chosen such that this engagement of tip end 68 of the rod and surface 52 is sufficient to frictionally maintain the seat in practically any position of rotation desired by the driver during normal range of rotation of the seat on the pedestal. For example, when the driver is dismounting from the vehicle, as above described, this frictional engagement of the rod and post maintains seat 22 facing doorway 12, so that when the driver reenters the vehicle he may merely turn to seat himself and then swing a quarter of a turn into driving position without taking another step within the vehicle.

As the driver swings the seat into driving position, rod end 68 travels along cylindrical surface 52. When seat 22 reaches its forward position facing the controls, rod 64 is aligned with aperture 53 into which its tip end 68 is immediately projected by the action of spring 67, thereby automatically relocking the seat base to the pedestal and maintaining the seat in the driving position. The inward axial movement of rod 64 when aligned with aperture 53 is not hampered by cam face 62 as it is so steeply inclined that pin 66 merely slides along that face. Reverse rotation of rod 64 during its locking thrust has no effect on its axial movement and merely returns handle 65 to its normal initial position.

Our novel seat assembly is therefore located in a convenient position within the vehicle enabling the driver to easily and speedily seat himself at the controls or dismount therefrom with a minimum of effort. The seat is automatically locked in driving position thereby avoiding any undesired movement thereof during operation of the vehicle, and it is capable of being frictionally held temporarily in a desired position to enable the driver to easily seat himself when he enters the vehicle so that he need not awkwardly twist his body in order to get into the seat.

Furthermore, the above described seat assembly is sturdy but simple and economical in construction and practically fool-proof in operation. Worn parts may be speedily replaced and the whole seat and seat base unit may be removed for repair and like purposes merely by unlocking rod 64.

Further embodiment

Figures 7-9 illustrate a further embodiment of the invention wherein seat base 25' is provided with a depending lug 69 which cooperates with an aligned aperture 71 in seat base sleeve 54' to rotatably and slidably support the inner end of a locking rod 72 having an integral handle 73.

Lug 69 projects laterally outwardly beyond the edge of the seat base and is formed along its outer end surface with an inclined cam face 73. A cam block 74, rigidly secured to rod 72 as by welding, is formed with an inclined cam face 75 adapted to lie along cam face 73.

Adjacent its inner end, rod 72 is provided with a rigid diametrical pin 76. A coiled spring 77, surrounding rod 72 and compressed between pin 76 and the inner face of lug 69, normally urges rod 72 axially inwardly toward post 48. Spring 77 also maintains cam faces 73 and 75 in engagement.

Rod 72 is located on the seat base similarly to rod 64, so that when handle 73 is pulled upwardly (clockwise in Figure 9) rod 72 is displaced axially outwardly by the action of cam faces 73 and 75 and against the force of spring 77 to withdraw the tip end of rod 72 from post aperture 53 and thereby render the seat base free for rotation upon post 48.

Block 74 is provided with a rigid pin 78 having a bevelled end face 79 adapted to engage the lower surface of seat base 25' and act as a stop to limit rotation of handle 73 to prevent revolution of cam face 75 beyond the high point of maximum outward displacement of rod 72. This prevents accidental re-engagement of the rod in aperture 53.

Otherwise the operation of the embodiment of Figures 7-9, including its automatic relocking function, is substantially the same as that described in Figures 1-6 above.

The invention may be embodied in other specific forms without departing from the spirit or essential characteristics thereof. The present embodiments are therefore not to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. In a vehicle seat assembly a vertically rigid pedestal, a seat base rotatably mounted on said pedestal, a locking rod rotatably and slidably mounted on said seat base, a spring normally urging said rod into engagement with a cooperating part of said pedestal to lock the seat base to the pedestal, a cam on said seat base and a cam follower on said rod, said cam and follower causing axial displacement of said rod away from said pedestal upon rotation of said rod in a predetermined direction.

2. In a driver's seat assembly, a rigid pedestal, a seat base rotatably supported on said pedestal, a spring loaded locking rod rotatably and slidably mounted on said seat base and having an inner end adapted to project into an aperture into said pedestal for locking the seat base to said pedestal in a predetermined position of rotation, cooperating cam faces on said seat base and rod for causing axial displacement of said rod upon rotation thereof to withdraw said rod from said aperture and permit free rotation of the seat base on the pedestal, and means limiting such rotation of said rod.

3. In a vehicle seat assembly, a pedestal having a cylindrical post provided with an external surface recess, a seat base rotatable on said post, a locking rod rotatably and slidably carried by said base, a spring normally urging said rod toward said post, a cam formed on said base and a cam follower on said rod, said spring maintaining said follower and cam engaged, and said cam and spring being designed to permit the tip end of said rod to enter said recess upon rotation of the base to a predetermined position on said pedestal.

HENRY V. HEDEEN.
CARL HEDEEN.